United States Patent

[11] 3,609,392

[72] Inventor Attila Tetik
New York, N.Y.
[21] Appl. No. 66,010
[22] Filed Aug. 21, 1970
[45] Patented Sept. 28, 1971
[73] Assignee General Instrument Corporation
Newark, N.J.

[54] DYNAMIC SHIFT REGISTER SYSTEM HAVING DATA RATE DOUBLING CHARACTERISTIC
4 Claims, 4 Drawing Figs.

[52] U.S. Cl. .......... 307/221, 307/238, 307/251
[51] Int. Cl. .......... G11c 19/00
[50] Field of Search .......... 307/205, 221 C, 221, 238, 251, 279, 304; 328/37

[56] References Cited
UNITED STATES PATENTS
3,454,785 7/1969 Norman et al. .......... 307/221 C
3,497,715 2/1970 Yen .......... 307/221 C X
3,524,077 8/1970 Kaufman .......... 307/221 C X
3,551,692 12/1970 Yen .......... 307/205
OTHER REFERENCES
Sidorsky, " MTOS Shift Registers," General Instrument Corporation Application Notes, Dec. 1967, pp. 1- 7. 307/221 C

*Primary Examiner*—Stanley T. Krawczewicz
*Attorney*—James & Franklin

ABSTRACT: A shift register system capable of operating at data rates which are double the clock signal rate comprises first and second registers which receive first and second unique clock signals in reverse order respectively. Data is alternately sampled by the first register during the first clock signal and by the second register during the second clock signal. An output stage, including register output signal inverting circuitry, is provided to reconstitute the data at the system output in a manner which substantially reduces the system DC power dissipation.

INVENTOR
ATTILA TETIK
BY
ATTORNEY

INVENTOR

ATTILA TETIK

BY

ATTORNEY

INVENTOR
ATTILA TETIK
BY James F. Franklin
ATTORNEY

DYNAMIC SHIFT REGISTER SYSTEM HAVING DATA RATE DOUBLING CHARACTERISTIC

The present invention relates generally to data systems, and particularly to a dynamic register system capable of operating at increased data rates.

Shift registers are commonly used in such computer sections as data storage devices, counters, and data input signal delay means. Registers of this type usually comprise a plurality of substantially identical series-connected stages.

In a dynamic shift register each stage receives clock pulses which are effective on each clock pulse cycle to shift or transfer data from one stage to a succeeding stage. The period of each clock pulse cycle is usually designated as one "bit" of data transfer, so that each data-shifting operation is performed during each bit. That unit of a shift register capable of introducing a time delay of one "bit" to a signal is also referred to as one "bit" of the register. Thus for a shift register having 10 bits, the data would appear at the output stage 10 bits after it is applied to the input stage of that register, that register being designated as a 10-bit register.

The maximum clock frequency is limited by practical design considerations. In the heretofore-known shift registers, maximum data rates are limited to the maximum available clock rate, usually in the range of 5 mHz. Design considerations of shift register are also generally directed to minimizing the power dissipated for a given clock rate, particularly when a large number of such registers are used in a computer system, as is typical. Generally speaking power dissipation increases with increasing clock rates.

In recent years one of the more significant advances in the field of logic circuitry has been the development of circuits utilizing field effect transistors (FETs), a large number of which can be readily fabricated on a single chip of semiconductor material to form one or more predetermined integrated circuits, and which have the further desirable characteristic of operating at high-speed and at low-power dissipation. Another significant advance in this field is the use of four-phase clock logic, in which four distinct clock phases, each having a predetermined time relationship with one another, are present within each clock pulse cycle. This type of logic is particularly suitable for use in logic circuits employing FETs, and has the advantage of increasing the operating logic flexibility of logic circuits, and also of significantly lowering the power dissipation of those circuits.

In an attempt to increase the rate at which data can be shifted in a shift register system and to lower the power dissipation of that system, a dynamic shift register system has been proposed in which two registers are utilized in parallel. The clock period is divided into two unique clock-derived signals which are applied in reverse order to the two shift registers. The first register samples the data input during the first clock signal and the second register samples the data during the first clock signal. Thus, the data is sampled twice during each clock period and the system may operate at twice the frequency of the system clock, that is, the data may change twice during each clock period. As each of the registers is shifted during opposite clock signals, the data in each register is shifted along the various register stages to the output stage of each register, the data signal at the two register output stages being representative of the two portions of the data signal respectively sampled at the input stages of each register. The register outputs are then combined by alternately sampling them during the same clock signals which cause their respective registers to sample, thereby to reconstitute the data at a system output. The output data is at the same rate as the input data, i.e. a rate twice that of the system clock. A "bit" of time delay for the input and output data signals is one-half that of a register "bit" so that the output signal is delayed from the input data signal by an amount corresponding to twice the number of bits in each register. In shift registers using four-phase clock logic, alternating shift register stages each shift and invert its respective input signal during one of the individual clock phases. As a result each stage provides a one-half bit delay for each clock phase, and a pair of such stages, each shifting during a different clock phase, produces a one-bit delay and is consequently also referred as a register bit. This terminology will be employed in the remainder of this application.

This type of register system, which may be described as a multiplex shift register, is thus effective to transfer data at twice the rate of the system clock and to provide a data delay equal to twice the number of bits in each of the shift registers forming that system. Since power dissipation is proportional to clock frequency, that system also provides reduced power dissipation for a given rate of data transfer since the effective clock frequency is essentially half that of the data transfer rate.

Such a dynamic multiplex shift register system, however, has in the past recombined the shift register outputs through the use of DC buffer amplifier and output stages these being deemed necessary to provide sufficient amplitude to drive the succeeding logic stages in the system, and to provide the proper isolation between the shift registers and those output stages. The operation of that buffer state, though controlled by the clock signals, still requires the steady-state dissipation of DC power for its operation and thus draws a substantial amount of power from the system power supply, thus negating one of the major advantages of multiplexing the shift register outputs.

Furthermore, the proposed system utilizes a two-phase clock, the phases of which are active during the major portion of the clock period, e.g. 75 percent of that period, in order to provide a sufficient width of clock signals to achieve the proper shifting of the data in the shift register stages. As a result, while this system has increased the rate at which data can be shifted through a shift register by a theoretical factor of to, the power dissipated in the overall system, including the output stage is nevertheless substantial. The use of two-phase clock signals produces another limitation on the theoretical advantages of multiplying. As higher clock rates are used the two phases tend to overlap, but in multiplexing this is not permissible, since the uniqueness of those two phases determines the exclusively alternate data sampling and output combination of the two registers.

It is a prime object of the present invention to provide a dynamic shift register having the ability of increasing the effective shifting rate of data through the register system while at the same time markedly decreasing the rate of power dissipation of that system.

It is a further object of the present invention to provide a dynamic shift register system which makes use of four-phase clock logic, thereby to effectively operate at twice the maximum frequency of the clock rate.

It is another object of the present invention to provide a dynamic shift register system which is capable of operating at twice the maximum frequency of the system clock and which provides effective delay between the output and input data signals at twice the number of bits of each of the shift registers in that system.

It is still a further object of the present invention to provide a dynamic shift register system of the type described in which no stage of that system draws steady-state DC current and in which the output stage is designed such that each of the logic and switching stages receives complementary inputs to bring about this result.

To these ends, the dynamic register system of the present invention comprises a pair of shift registers each having an input tied to a data node at which the input data signal is received. First and second time-displaced signals are operatively connected to these registers, preferably in a reverse order, so that the data is sampled in the first register during the first of these timed signals, and is sampled in the second register during the second timed signal, thereby to respectively produce first and second data derived input signals in the first and second registers. The output of the shift registers are operatively connected to an output stage which includes means effective to produce the trues and complements of the output signals of each of the shift registers which correspond to the data-derived input signals of these registers which have been shifted along the register by means of the timed signals. These trues and complements are used to produce a system output data signal which corresponds to the input data signal and is displaced from that signal by a predetermined time delay corresponding to twice the number of bits in each of the shift registers. The rate of the data signals, both input and output, will be twice that of the clock rate of the timed signals operating the shift registers.

The output stage of the dynamic shift register of this invention includes first, second, third and fourth logic stages which receive as inputs the trues and complements of the outputs of each register in a reverse order, and are respectively effective to produce an intermediate signal and its converse. These latter two signals are then applied to first and second switches comprising the final output stage, that stage being effective to produce the desired system data output signal at a system output node. The use of complementary inputs to drive each of the output logic stages, including the final output switching stage, is effective to prevent the flow of steady-state DC current. Hence, the output data signal stage that produces the desired data output signal operates in a manner which substantially reduces the required power drain as compared to prior art systems of this type.

To the accomplishment of the above, and to such other objects as may hereinafter appear, the present invention relates to a dynamic shift register system, as defined in the accompanying claims and as described in the specification, taken together with the accompanying drawings, in which:

The shift register system of the present invention like most shift registers, receives data at a given rate, shifts that data a predetermined number of bits, and reconstitutes the data at an output in a form corresponding to the data input but at a predetermined time delay with respect to the input. In a significant aspect of this invention, the rate at which the individual shift register stages are shifted, that is, the clock rate at which the system operates, is half that of the data shift rate. This is made possible by utilizing two shift registers, and by sampling the input data and shifting that sampled data in each register at different portions of a clock period. The data is reformed at the output utilizing the same clock signals in a manner in which a minimum amount of DC power id dissipated form the system power supply. The reduction in power dissipation brought about by the effective halving of the system clock rate required for shifting data at a given rate, together with the reduction in power dissipation in the output circuit of the present invention, markedly reduce the overall system power consumption. This provides a more efficient operation of the shift register of the present invention, particularly important in large scale logic or data processing systems when a plurality of such shift register systems are commonly employed.

Figures 1, 2:
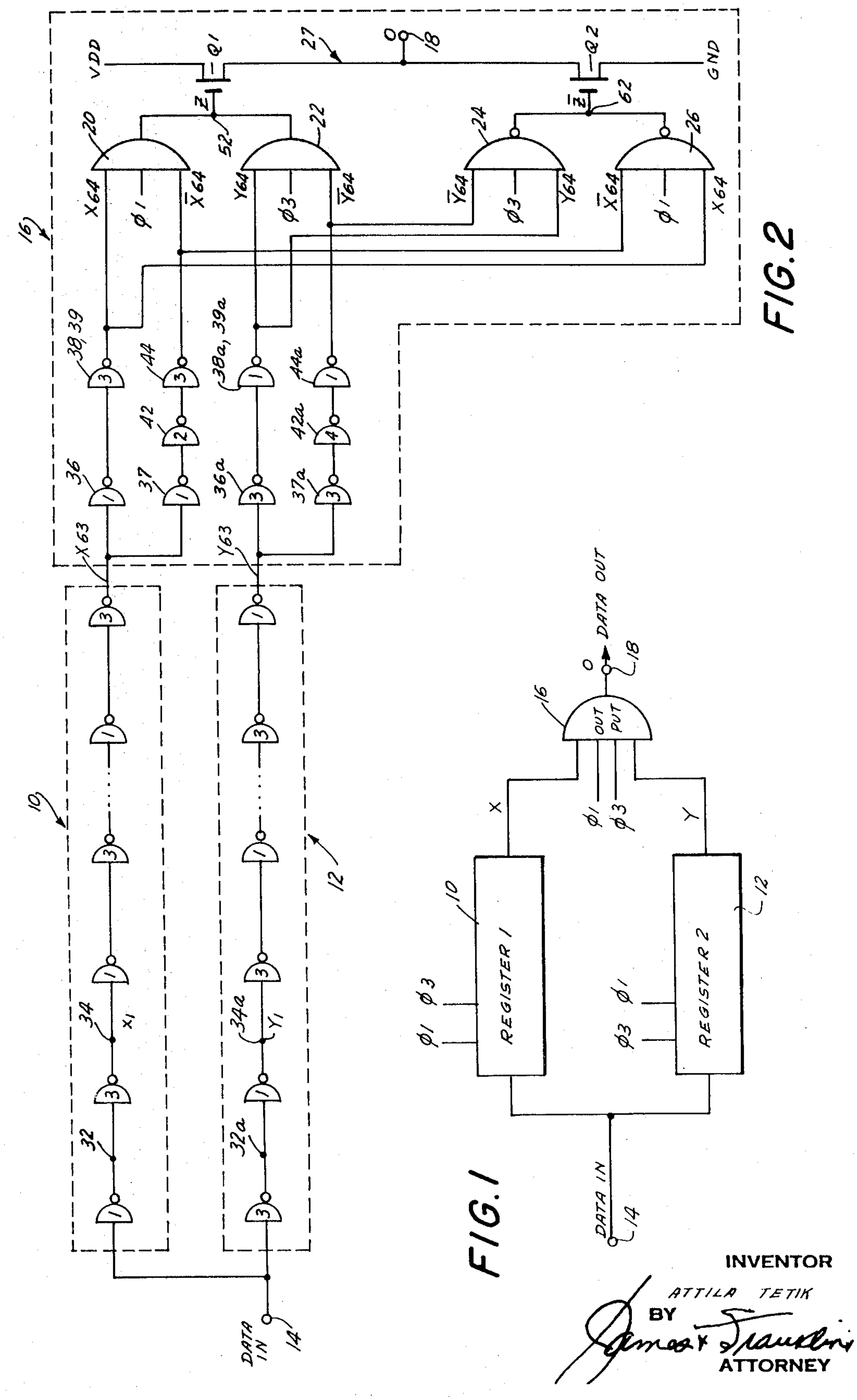
FIG. 1 is a simplified block diagram of the shift register system of the present invention.
FIG. 2 is a more detailed block diagram showing features of the diagram of FIG. 1.

As seen in FIG. 1, the shift register system of this invention comprises a first shift register 10 and a second shift register 12 connected in parallel. The input stage of each register is connected to a data node 14 at which the input data signal is applied. The output stage of each register 10, 12 is connected to an output circuit generally designated 16 at which the data signal is reconstituted and fed to system output node 18.

Figure 4:
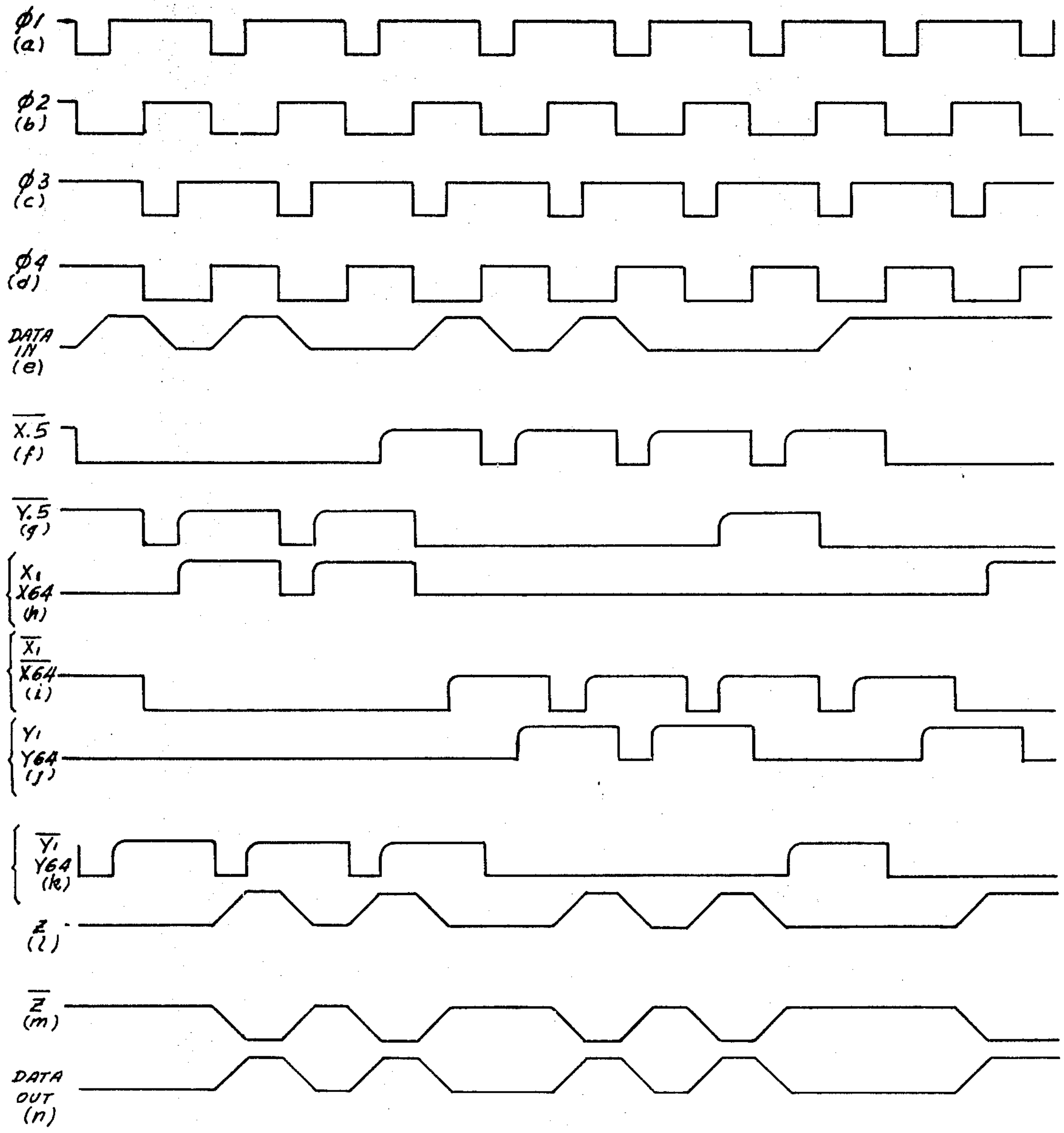
FIG. 4 illustrates the wave forms of the clock signals and data signals of the dynamic shift register of the present invention.

The shift register system of FIG. 1 operates under the control of four clock signals shown in lines *a–d* of FIG. 4, in which each period of the system clock is divided into clock phases Φ1, Φ2, Φ3, and Φ4. Clock phases Φ1 and Φ3 are operative (negative) at unique or displaced portions of a clock period, clock phase Φ2 overlaps clock phase Φ1 and extends until the onset of clock phase Φ3, and clock phase Φ4 begins at the onset of clock phase Φ3 and extends until the onset of the next clock phase, Φ1. In this specification, that portion of the period in which any of the operative clock phases are negative will be referred to as the "time" of that clock phase. For example, "Φ1" time indicates the portion of the clock period in which the clock phase Φ1 is negative.

The clock phases, particularly clock phases Φ1 and Φ3, are applied in reverse order to the stages in shift registers 10 and 12 so that the data is sampled and shifted between the bits in register Φ1 and Φ3 times, and sampled and shifted between the bits of register 12 in Φ3 and Φ1 times. Clock phases Φ1 and Φ3 are also applied to the output circuit 16 in specified fashion and are effective to recombine the outputs of each of the shift registers 10 and 12 to from the system output data signal at node 18 having the desired logic information and time displacement with respect to the input data signal. This is done by first forming the trues and complements of the register output data-derived signals, and then combining these trues and complements in a series of output logic stages in a particular manner under the control of clock phases Φ1 and Φ3. The operation of output circuit 16 dissipates no steady-state DC power.

Figure 3:
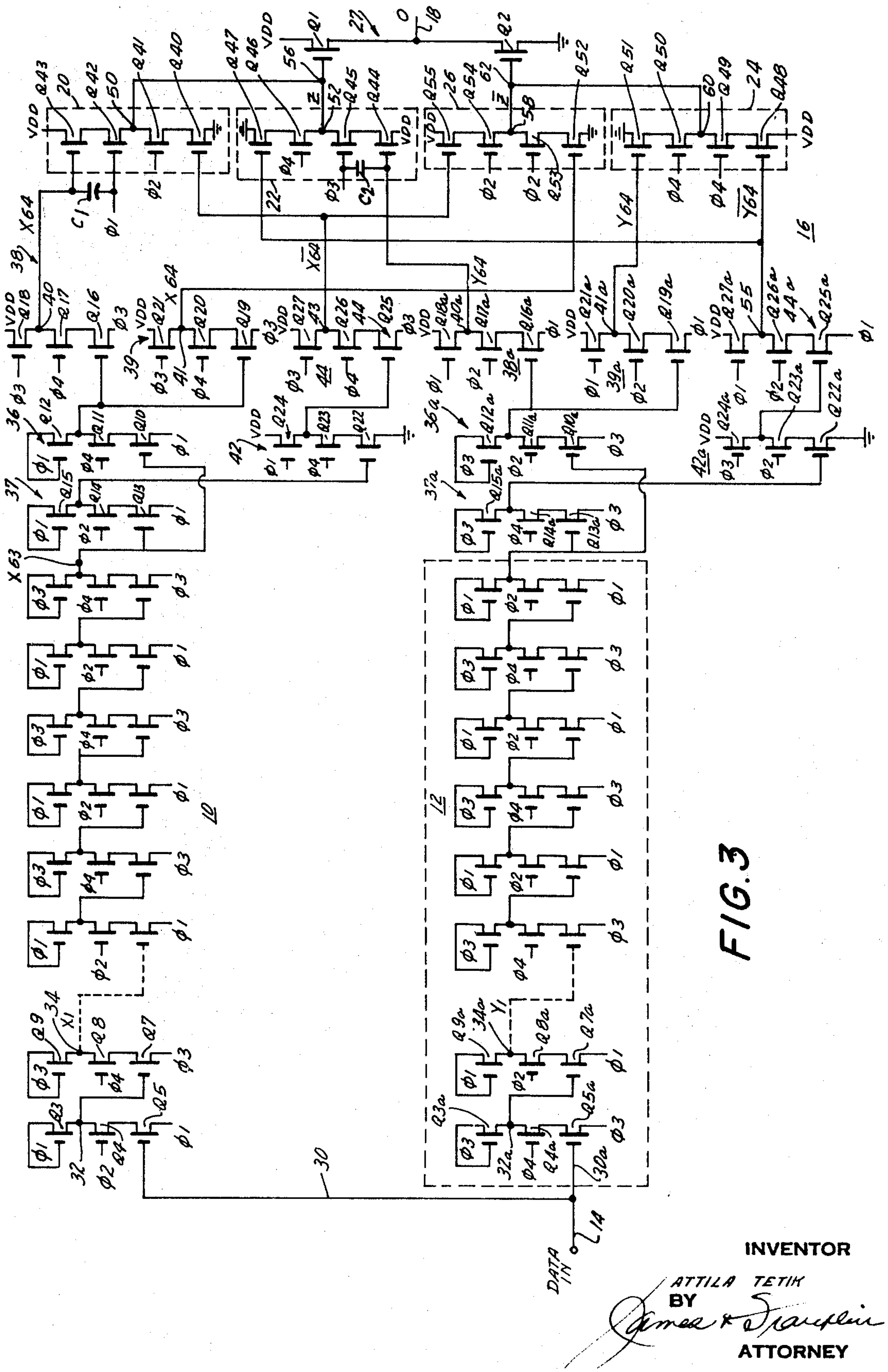
FIG. 3 is a schematic circuit diagram of the shift register system of FIGS. 1 and 2.

The particular shift register system chosen to illustrate the present invention comprises two such registers 10 and 12 comprising 63 bits; each register thus providing a delay of 63 bits between its input and its output stages. The overall system delay will be twice that of each individual register plus the additional two-bit delay in output stage 16 to achieve an overall 128-bit delay between the output data signal and the input data signal. As seen in FIG. 2, each bit of shift registers 10 and 12 comprises a pair of inversion shift register stages, the output of the first stage being connected to the second stage in a manner such that the output of the second stage is a reproduction of the input at the first stage shifted by one bit. As seen in FIG. 3, each inversion stage comprises three field effect transistors (FETs) having their output circuits connected in series, with the upper and lower FETs receiving either of clock phases Φ1 or Φ3 at their output circuits the middle FET receiving either clock phase Φ2 or Φ4 at its control or gate terminal. In the drawings, those inversion stages which are operative during Φ1 time, that is those which receive the Φ1 clock phase, are identified by the numeral 1, and those stages operative during Φ3 time are identified by the numeral 3. Thus, each bit of shift registers 10 and 12 comprises a 1 stage connected to a 3 stage or vice versa. In FIG. 2 it will be noted that shift register 10 comprises a 1 stage connected to a 3 stage, and so on, while shift register 12 comprises a 3 stage connected to a 1 stage, and so on. These stages are repeated in their respective alternating sequence throughout the respective shift registers to provide the desired number of bits. The input stage of shift register 10 samples the input data signal from input node 14 during Φ1 time, produces a first data-derived signal at the output of its first 1 stage at a one-half bit delay after the sampling, produces a second data-derived signal at the output of its first 3 stage one-half bit in the time thereafter, and shifts that letter signal to the 1 stage of the next bit during the next Φ1 time. Shift register 12 functions similarly, but with 1 and 3 stages reversed and with the sampling and bit-to-bit shifting occurring during Φ3 time. Thus, the data signal is sampled twice during each clock period; once during Φ1 time at register 10 and then during Φ3 time at register 12.

The data-derived signals designated X and Y in FIG. 1 appear at the output stage of each of registers 10 and 12 and are connected to the input of output circuit 16. These signals are then inverted in output circuit 16 to produce additional signals $\overline{X}$ and $\overline{Y}$ which are the respective complements of the X and Y signals. The true and complemented register output signals are combined in output circuit 16 to produce the system output data signal at node 18.

As shown in FIG. 2, output circuit 16 comprises four logic stages in the form of OR-gates 20, 22, 24 and 26, logic stages 20 and 26 receiving signals X and $\overline{X}$ in reverse order, and stages 22 and 24 receiving the Y and $\overline{Y}$ signals in reverse order. The combined output of logic stages 20 and 22 is designated as the intermediate data output signal Z which has the same logic pattern as the data input circuit but is of insufficient amplitude to drive the external logic circuits (not shown). To produce a proper driving output signal, an additional intermediate output signal $\overline{Z}$, the complement of the Z data signal, is produced at the combined outputs of logic stages 24 and 26.

Intermediate data signals Z and $\overline{Z}$ are connected to the inputs of a push-pull output stage 27 comprising FETs Q1 and Q2 to produce the data output signal at node 18 in a manner to be described more completely below. As a result of the formation of the trues and complements of each of the relevant output data signals, i.e. the shift register output data-derived signals X and Y and the intermediate data signal Z, each stage in output circuit 16, i.e. the logic stages 20–26 and output push-pull output stage 27, each receive complemented input signals. Since one input signal to each stage is positive when the other input signal to that stage is negative, the path between between a source of negative voltage $V_{DD}$ and ground in any of these stages will not be conductive at any time. Hence no steady-state DC power will be dissipated.

Shift registers 10 and 12 are each formed of repeating shift register bits, each of which comprises two inversion stages. Since the circuits of each bit in both registers are substantially identical in design, with the exception that they receive the clock phases Φ1 and Φ3 in reverse order, only the first bit of registers 10 and 12 will be described, the parts in register 12 being differentiated from the corresponding parts in register 10 by the letter *a*. Referring to FIG. 3, the first inversion stage of register 10 comprises FETS Q3, Q4 and Q5, the output circuits of which (the circuits between their drain and source terminals) are connected in series. The gate of FET Q3 is tied to its source and clock phase Φ1 is applied to both of these terminals. The gate of Q4 receives clock phase Φ2. The gate of FET Q5 is connected by lead 30 to the data input node 14 so that the input data signal (a typical data signal being shown in line *e* of FIG. 4) is applied to the gate. The drain of FET Q5 receives the clock phase Φ1. The data signal is also connected by lead 30*a* to the gate of the lower FET Q5*a* of the first stage of shift register 12. A point 32, defined between the output circuits of FETs Q3 and Q4, is connected to the gate of FET Q7, the lower FET in the second stage of the first bit of register 10, that second stage also comprising FETs Q8 and Q9 the output circuits of which are connected in series with one another and with that of FET Q7. The source and gate of FET Q9 are tied together and clock phase Φ3 is applied thereto. Clock phase Φ3 is also applied to the drain of FET Q7 and clock phase Φ4 is applied to the gate of FET Q8. It will be noted that the two circuits forming the first bit of register 10 are substantially identical to one another with the exception that they are controlled by different clock phases, that is clock phase Φ1 controls the first stage (a 1 stage), and clock phase Φ3 controls the second stage (a 3 stage).

In operation, point 32 is precharged through the output circuit of FET Q3 which is turned on during Φ1 time. During Φ2 time, the output circuit of FET Q4 is turned on and will connect the output circuit of FET Q5 to point 32. If the data signal at the gate of FET Q5 is positive at that time, the output circuit of FET Q5 remains off and point 32 remains at its negative precharged level. If, on the other hand, the data signal is negative at that time, the output circuit of FET Q5 is turned on and the clock phase Φ1 (then positive) is transferred during the latter half of Φ2 time, that is after the termination of Φ1 time, to point 32 to establish a positive level thereat. Point 32 remains at its positive level until the succeeding Φ1 time at which time it is once again charged negative. Thus, the sampled data signal level at point 32 is an inversion of the level of the input data signal during the latter half of Φ2 time. For the typical data signal shown in line *e* of FIG. 4, the signal at point 32 is the $\overline{X.5}$ signal shown *f* of FIG. 4, representing the data sampling and inversion and the one-half bit of delay at the first stage of register 10.

A point 34, defined between the output circuits of FET Q8 and FET Q9, is precharged negative during Φ3 time through the output circuit of FET Q9 which is turned on by the Φ3 clock phase applied to its gate. The signal at a point 32 is connected to the gate of FET Q7 and if negative, will turn on that transistor to conduct the Φ3 clock phase through the output circuits of FET Q7 and FET Q8, the latter being turned on during Φ4 time, to point 34. As the Φ3 clock phase is positive during the latter half of Φ4 point 34 is charged to a positive level which remains until the succeeding Φ3 time at which time point 34 is again charged negative. If the signal at point 32 is positive, the output circuit of FET Q7 remains turned off and the signal at point 34 remains at its negative precharged level until a subsequent time at which FET Q7 is turned on by a negative signal from point 32 during the latter half of Φ4 time. The data-derived X signal shown in line *h* of FIG. 4 is the signal produced at point 34, that signal being inverted and an additional half-bit delayed from the $\overline{X.5}$ signal produced at point 32.

As the first stage of shift register 10 is controlled by the Φ1 clock phase, it is seen that the input data signal applied to the gate of FET Q5 is effectively sampled and transferred to point 32 during only the latter half of Φ2 time. In the second stage of the first bit of register 10, the signal at point 32 is sampled and transferred to point 34 during the latter half of Φ4 time. That X data-derived signal represented the input data signal sampled during Φ1 time and having a delay of one bit, defines the input signal to the succeeding bit of shift register 10, which in turn comprises a 1 stage which is applied to a succeeding 3 stage. This process is repeated through as many bits as required for system operation until an output data-derived signal (X 63 in FIG. 3) appears at the final output stage of shift register 10. That signal is delayed from the input data signal by a number of bits equal to the number of bits in that register.

Shift register 12 operates in essentially the same manner with the exception that its stages are operated in reverse order with respect to the clock phases Φ1 and Φ3. That is, its first stage comprising FETs Q3*a*, Q4*a* and Q5*a* receives the data input at the gate of FET Q5*a*, samples that data signal during Φ3 time and shifts it to the second stage of the first bit of that register, which in turn produces an inverted data-derived signal $\overline{Y.5}$ (line *g* of FIG. 4) at node 32*a* during the latter half of Φ4 time. At the next Φ1 time the signal at a point 32*a* is shifted by an additional half bit of delay to a second stage comprising FETs Q7*a*, Q8*a* and Q9*a* to produce the Y1 signal at point 34*a* which corresponds to the input data signal sampled during Φ3 time delayed by a period of one bit.

The X1 and Y1 signals respectively produced at the outputs designated the first bits of registers 10 and 12 are thus respectively sampled from the input data signal during Φ1 and Φ3 time. Those signals appear at essentially the same form at the outputs of their corresponding shift registers and are delayed from the input signal by a predetermined delay. As registers 10 and 12 in the disclosed system each contain 63 bits, the output data-derived signals from each of registers 10 and 12 are delayed by 63 bits of delay and are therefore designated in FIGS. 2 and 3 as X63 and Y63.

The X63 signal is applied to the input gates of a pair of 1 inverter stages 36 and 37, stage 36 comprising FETs Q10, Q11 and Q12, and stage 37 comprising FETs Q13, Q14 and Q15. Each of these stages inverts and produces a half-bit delay to the X63 signal. The output stage 36 is applied to the input of a 3 inverter stage 38 comprising FETs Q16, Q17 and Q18 and to an identical inverter stage 39, comprising FETs Q19, Q20 and Q21. Stages 38 and 39 further invert the input signal and produce the X64 signal (line *h* of FIG. 4) at nodes 40 and 41, that signal being the output signal X63 of shift register 10 delayed by an additional bit. The output signal of inverter stage 37 is applied to the input of a 2 inverter stage 42 which comprises FETs Q22, Q23 and Q24 having their output circuits connected in series, which produces an inversion in that signal. The output signal of stage 42 is applied to the input of a 3 inverter stage 44 comprising FETs Q25, Q26 and Q27 which produce a third inversion and together with 2 stage 42 another half-bit of delay to produce the $\overline{X64}$ signal (line *i* of FIG. 4) at node 43. From an inspection of lines *a*, *b*, *h* and *i* of FIG. 4 it will be seen that the X64 signal and the $\overline{X64}$ signal are complementary with respect to one another during each Φ1 and Φ2 time.

In a similar manner, the Y63 output data-derived signal of shift register 12 is connected to a pair of 3 inverter stages **36*a* and 37*a*** comprising FETS Q10*a*, Q11*a* and Q *a* and FETs Q13*a*, Q14*a* and Q15*a* respectively. The output of stage **36*a* is connected to the inputs of a pair of 1 inverter stages 38*a* and 39*a*** which comprise FETs Q16*a*, Q17*a* and Q18*a*, and FETs Q19*a*, Q20*a* and Q21*a* respectively. The output signal of stages **38*a* and 39*a* produced at nodes 40*a* and 41*a*** respectively, is the Y64 signal (line *j* of FIG. 4) having a one-bit displacement with respect to the Y63 signal but equivalent in other respects thereto. The output signal of stage **37*a* is connected to the input of a 4 inverter stage 42*a*** comprising FETs 22*a*, Q23*a* and Q24*a* which produces an inversion to that input, the output of stage **42*a* in turn being connected to the input of a 1 inverter stage 44*a*** comprising FETs Q25*a*, Q26*a* and Q27*a* which produces at node 55 the $\overline{Y64}$ signal shown in line *k* of FIG. 4. That signal is one bit delayed with respect to the Y63 signal input to stage **37*a*** and, as seen from an inspection of lines *c*, *d*, *j* and *k* of FIG. 4, is the complement of the Y64 signal at each of Φ3 and Φ4 times.

Logic stage 20, which receives the true X64 signal and its complement, the $\overline{X64}$ signal, comprises FETs Q40–Q43. The X64 signal is applied to the gate of FET Q43, and a portion of that signal is also applied to the gate of FET Q42 through a capacitor C1, that gate also receiving the Φ1 clock phase. The Φ2 clock phase is applied to the gate of FET Q41. During Φ1 time, at which time the output circuit of FET Q42 is conductive, if the X64 signal is negative, the output circuit of FET Q43 is conductive and the negative $V_{DD}$ voltage is connected through the output circuits of FETs Q43 and Q42 to node 50. Conversely, if signal X64 is positive during Φ1 time the output circuit of FET Q43 remains closed, and the negative $V_{DD}$ voltage is not connected to node 50. However, if X64 is positive, $\overline{X64}$ is of necessity negative at that time so that the output circuit of FET Q40 is conductive and connects node 50 to ground through the output circuits of FETs Q40 and Q41, the latter being turned on during Φ2 time. As a result, a ground potential appears at node 50 at this time. At any time during Φ1 or Φ2 time, either FET Q40 or FET Q43 must be turned off since one of these transistors receives a positive signal at its gate at these times. The conduction path between the $V_{DD}$ supply and ground is thus at all times blocked. (During times other than Φ1 and Φ2 times FETs Q41 and Q42 are nonconductive).

Logic stage 22 comprises FETs Q44, Q45, Q46 and Q47 having their output circuits connected in series. The gate of FET Q44 receives the $\overline{Y64}$ signal a portion of which is coupled through a capacitor C2 to the gate of FET Q45 which also receives the Φ3 clock phase. The gate of FET Q47 receives the Y64 signal and the gate of FET Q46 receives the Φ4 clock phase. The source of FET Q44 is connected to the $V_{DD}$ supply and the source of FET Q47 is connected to ground. A node 52 is defined between the output circuits of FETs Q45 and Q46. If the Y64 signal is negative during Φ3 time the negative $V_{DD}$ voltage is connected through the output circuits of FETs Q44 and Q45 to node 52, thereby to charge that node negative, and on the contrary, if Y64 is positive, indicating that the $\overline{Y64}$ signal is negative, FET Q47 is conductive and connects node 52 to ground through the output circuits of FETs Q46 and Q47, thereby to establish a ground potential at node 52. Nodes 50 and 52 of logic stages 20 and 22 are tied to a node 56 at which an intermediate signal Z is produced, a represented in line 1 of FIG. 4, that signal being negative if either of nodes 50 or 52 is negative, and being at ground potential when the level at both nodes 50 and 52 is at ground. Thus, during Φ1 and Φ2 times the level of signal Z is determined by the Y signal from register 10, and during Φ3 and Φ4 times it is determined by the Y signal from register 12. That intermediate signal Z is thus a reconstituted version of the input data signal produced in output circuit 16 under the timed control of the same clock signals, i.e. Φ1 and Φ3 which sampled the input data signal to initially derive the X and Y signals in registers 10 and 12, respectively.

The intermediate data signal Z is applied to the gate of an output push-pull FET Q1 whose source is tied to the $V_{DD}$ supply and whose drain is connected to the output system node 18. However, to insure that the push-pull output stage 27 draws no DC stage power, a $\overline{Z}$ intermediate data signal, is produced by logic stages 24 and 26 comprising FETs Q48–Q51 and FETS Q52–Q55 respectively. Stages 24 and 26 are identical in design and manner of operation to logic stages 20 and 22, with the exception, as shown best in FIG. 2, that the inputs to stages 24 and 26 are reversed with respect to the inputs to logic stages 22 and 20 respectively. Thus when the X64 signal is negative during Φ1 and Φ2 times, output node 58 of stage 26 is connected to ground through the output circuits of FETS Q52 and Q53, and when it is positive, i.e. when the $\overline{X64}$ signal is negative, node 58 is charged during Φ2 time to the negative $V_{DD}$ supply through the conduction output circuits of FETs Q54 and Q55. Similarly output node 60 of logic stage 24 is at ground if the Y64 signal is negative during Φ4 time, and is charged negative, if that signal is positive, (i.e. the $\overline{Y64}$ signal is negative) during that time. Nodes 58 and 60 are connected to a node 62 at which the complemented intermediate signal $\overline{Z}$ (line *m* of FIG. 4) is produced. That signal is connected to the gate of FET Q2, the source of which is tied to ground. Thus, when the Z intermediate signal is negative, the output circuit of FET Q1 is turned on and output node 18 is charged negative to the level of the $V_{DD}$ supply. If the Z intermediate signal is negative (when the Z signal is positive) the output circuit of FET Q2 is conductive to connect node 18 to ground thus establishing a ground level at node 18. The output signal 0 at output node 18 thus corresponds in form to the intermediate output signal Z which in turn corresponds to the input data signal at input node 14. The system output signal 0 is, however, delayed from that input data signal by a bit delay equal to twice the number of bits in each of the shift registers 10 and 12, plus the additional bits of delay produced in output circuit 16.

The signal 0 at output node 18 shown in line *n* of FIG. 4 is a reconstitution of the data input signal at line *e* of FIG. 4, with a delay of 128 bits from that input signal. The frequency of the data output signal, corresponding to the frequency of the input data signal, is twice that of the rate of the system clock since each of the registers samples the input data during one portion of a clock period, and the data is reconstituted in the output circuit 16 twice each clock period. Thus, the output data signal 0 has the desired logic information and the desired delay as compared to the input signal, and is produced by a shift register system which operates at a clock rate at half the rate of that data signal. This has the effect of increasing the frequency capacity of the shift register system since for a maximum clock rate a data signal having twice that rate can be shifted through that system. On the other hand, the effective halving of the clock rate as compared to the data rate also produces a reduction in power dissapation. That reduction in power dissipation id further augmented by the operation of the inverting logic and output stages in output circuit 16, in which each stage receives complementary input signals so that no steady-state DC power is dissipated. The shift register system of this invention as disclosed herein thus has the capability of operating and transferring data at rates which have heretofore been unattainable with a reduced amount of DC power dissipation.

While only a single embodiment of the present invention has been herein specifically disclosed, it will be apparent that many variations may be made thereto without departing from the spirit and scope of the invention.

I claim:

1. A dynamic register system comprising a data node for receiving an input data signal, first and second shift registers each having an input and an output, said inputs being operatively connected to said data node, a source of first and second time-displaced signals operatively connected to said first and second registers, said first register comprising means effective to sample said data signal during said first timed signal, thereby to produce in said first register a first data-derived input signal, said second register comprising means effective to sample said data signal during said second timed signal, thereby to produce in said second register a second data-derived input signal displaced in time from said first data-derived input signal, and system output means including means operatively connected to said register outputs effective to produce the trues and complements of said first and second data-derived input signals respectively when they appear at said register outputs as first and second output signals respectively, and to produce form said trues and complements a system output data signal corresponding to and in timed relation with said input data signal.

2. The dynamic register system of claim 1, in which said system output means comprises first logic means having an input and an output, said input receiving the trues and complements of said first data-derived input signal, second logic means receiving the trues and complements of said second data-derived input signal, and means operatively connecting the outputs of said first and second logic means and effective to derive an intermediate output signal.

3. The dynamic register system of claim 2, further comprising third and fourth logic means having an input and an output, said input receiving said trues and complements of said first and second data-derived input signals respectively, and means operatively connecting the outputs of said third and fourth logic means and effective to derive an inverse of said intermediate output signal.

4. The dynamic register system of claim 3, further comprising a system output node, first and second switch means operatively connected to said system output node, respectively to sources of first and second signals, and respectively receiving said intermediate output signal and its said inverse to be selectively actuated by either said one intermediate signal or its said inverse, and effective when so actuated to selectively operatively connect one of said first and second signals to said output node, thereby to define said system data output signal.